3,484,508
PROCESS OF MAKING SPONGEOUS TRANSFER MEDIUM FOR MODERATE IMPACT APPLICATIONS
Hugh T. Findlay, Lexington, Ky., assignor to International Business Machines Corporation, Armonk, N.Y., a corporation of New York
No Drawing. Filed May 3, 1967, Ser. No. 635,671
Int. Cl. B29d 27/06, 27/00
U.S. Cl. 264—45                                          9 Claims

ABSTRACT OF THE DISCLOSURE

The specific embodiment described in this patent specification is a process to produce a porous or matrix typewriter ribbon in which the liquid ink is initially substantially less in volume than the volume of the pores of the transfer layer and in which total pore volume is enlarged. It has been found that the resulting product produces a significantly denser printed image under typing impacts of only moderate force. The preferred process to make the product is by incorporating in the fluid dispersion of materials to make the transfer layer, a low volatility oil which is miscible, but not highly miscible with the oils of the fluid ink components. The low volatility oil is of a volume which mixes with the volume of the fluid ink to increase that volume by roughly one-fourth. The dispersion to make the matrix transfer layer is cast and solidified, and then the solidified material is treated to drive off virtually all trace of the low volatility oil. The matrix layer is thereby finally formed with larger pores only about three-fourths filled with fluid ink.

BACKGROUND

The spongeous or matrix transfer medium technology is becoming fairly well understood in certain respects and is basically known in the art, as illustrated by U.S. patent appliction Ser. No. 536,557, filed Mar. 9, 1966, now Patent 3,413,184 issued Nov. 26, 1968, entitled Transfer Medium And Method For Making Same, by Hugh T. Findlay and Kenneth H. Froman, and assigned to the same assignee as this invention is assigned. (The above is a continuation in part of subject matter largely published on July 29, 1964, in United Kingdom patent specification 965,517.) The matrix transfer layer is basically a layer of film forming resin having a porous structure with a fluid marking material held in those pores generally in the manner of a sponge. As set forth in said U.S. patent suitable synthetic polymers for use as the continuous porous matrix include the following: nylon, polyurethane, polycarbonates, polyethylene, polypropylene, polyvinyl alcohol, epoxy resins, cellulose acetate butyrate and cellulose acetate. Other synthetic resins or mixtures of synthetic and natural resins capable of forming thin, self-supporting porous matrices may be substituted for the foregoing without departing from the scope of the invention. The matrix transfer medium may be formed by several different known processes and the product may include a supporting layer and other structures.

The grist of the invention here described is in the intentional depletion of a relatively large amount of ink from the pores of the matrix as a part of the fabrication of a transfer medium and prior to the first normal use of the transfer medium for printing. The desired results are at least partially realized simply by this depletion, but generally the print quality desired will be obtained only when the depletion is a part of a matrix layer having a significant increase in average pore volume size. No pertinent prior art in this regard is known, but the basic physical chemistry used during the processing is essentially well known. Also, in a patent application Ser. No. 635,864 filed on May 3, 1967, entitled Environment Adapted Spongeous Transfer Medium, by William H. Horne and the same Hugh T. Findlay who is the inventor of this invention, and assigned to the same assignee as the invention is assigned, a generally similar transfer medium is described in which a small amount of ink is removed from the pores so that atmospheric and similar conditions will not cause the liquid ink to be subsequently forced to the surface of the transfer medium. As clearly stated in that patent application, no increase in print density or other image quality was observed in connection with that invention. That apparently was true because the amount of ink removed was too relatively small to cause significant improvement in print quality.

In the prior art the matrix is generally formed from raw materials around the fluid ink. Generally the resin body of the matrix is initially held in solution by a dispersing solvent for that resin, and the liquid and other ink materials are in dispersion in the same solution with the resin body. That solution is cast onto a support and the matrix transfer layer is formed by driving off only the materials solvating the resin body. In that technique, therefore, and in all other pertinent techniques known, the resulting product when ready for initial use has pores essentially entirely or largely filled with the fluid marking material.

I have found that surprisingly better print density during use of the product under normal printing and typing conditions is provided by substantial reduction of the initial amount of ink in the pores. It seems clear after consideration of the print qualities obtained that the partially filled pores having substantial empty areas make possible a build-up of substantial motion and kinetic energy of the solid marking pigments and perhaps of the dyes, which is not otherwise obtained and which allows more of this coloring matter to move to the surface printed upon. A transfer medium in accordance with this invention is especially useful in typing and other printing applications in which only moderate printing pressure is created. The use of moderate printing pressure is generally desirable, however, since this causes less wear on the ribbon and less embossing of the material printed upon, so this invention is generally useful in most applications.

It is the basic object of this invention to provide a matrix transfer medium which yield a flow of ink under writing pressure having relatively more useable colored matter to thereby produce denser printed images.

In accordance with this invention a matrix transfer layer formed of a film forming body and having flowable ink in its pores is treated so as to remove a relatively large portion of that flowable ink and produce pores with less obtruction to ink flow so that printing from the matrix will have significantly increased color density. The transfer layer is made from raw materials, and the transfer layer is then treated to reduce the volume of flowable ink in the pores. In the preferred process, a low volatility material is included in the blend of raw materials from which the matrix medium is formed by casting and expulsion of a solvent of the resin body of the matrix medium. After the matrix medium is initially thus formed, the matrix medium is treated so as to evaporate the low volatility material.

The foregoing and other objects, features and advantages of the invention will be apparent from the following more particularly description of a preferred embodiment of the invention.

Except as detailed below, the transfer mediums here described are intended to be generally in accordance with the processes and products described in the above mentioned application Ser. No. 536,557 or described in the above mentioned copending application entitled Environment Adapted Sponeous Transfer Medium or as in other teachings of matrix transfer technology. In general, the body of the matrix or spongy layer in accordance with this invention is nylon mixed with significant amounts of finely divided filler. Nylon is preferred because of its inherent strength and resistance to cutting under the direct impact of a type die. It has also been found generally necessary in the design of typewriter ribbons to provide a support layer, and that support layer generally should not contain liquid ink or other ingredients sufficient to weaken the support layer against being cut by impacting type dies. In carbon papers the backing layer protects the prior paper sheet from being printed upon by the transfer medium under it.

Consequently, Example I of the above mentioned application Ser. No. 536,557, now Patent 3,413,184, or the specific embodiment described in connection with FIG. 1 of the above mentioned copending application entitled Environment Adapted Spongeous Transfer Medium may be considered basically descriptive of the more specific aspects of the preferred embodiment here, except to the extent that differences are pointed out or are apparent. Also, a woodflour filler is the preferred filler. The ribbon produced by these two teachings does not yield quite as dense printing as desired when used as a typewriter ribbon in typewriters striking with only moderate impact, such as the single element typewriter manufactured and sold in large quantities during the preceding several years by the assignee of this invention. To substantially increase the print density obtained, the following changes are made during the processing of the typewriter ribbon.

Into the blend of raw materials from which the transfer medium is made, a liquid of relatively low volatility is added. A solid transfer layer is then made by casting and driving off the solvent as described in those two teachings. In accordance with this invention, the material of low, but significant volatility is preferably Isopar G, a synthetic kerosene, the product of Humble Oil Co. It is included and cast as a part of the rest of the blend of raw materials. The volume of the liquid ink part of the blend including the pigments of the ink, is selected to be roughly three-fourths of the volume of the combination of the liquid ink and the added synthetic kerosene.

The composition of the blend of raw materials from which the transfer layer is made by casting and extracting the alcohol solvent is: nylon—6 parts by weight, woodflour—5 parts by weight, fluid ink (including pigments) —16 parts by weight; synthetic kerosene—5 parts by weight. Enough denatured ethyl alcohol is used to fully solvate or disperse all the components. The liquid ink is the only element in this composition which comprises more than one ingredient. The liquid ink is composed as follows:

| | Wt. percent |
|---|---|
| Black pigment 1686 dye and carbon black composition Dye Specialties Company | 6.0 |
| 2451L black pigment dye and carbon black compotion Paul Uhlich & Company | 10.0 |
| Nigrosine Oleate (1part by weight Nigrosine Base N) (2 parts by weight Oleic Acid) | 63.0 |
| Methyl Violet Base E. I. du Pont de Nemours and Co. | 3.0 |
| Ohopex R-9. Mixed octyl esters of oleic acid Ohio Apex Company | 18.0 |
| | 100.0 |

In final product formed by above process, the average pore volume near the surface from which ink is transferred during normal typing operations definitely is at least twice the volume of the nylon and filler phase, and probably is in fact significantly larger than two times that volume.

Further processing is essentially the same in every regard except as is apparent or is noted here as the processing described in application Ser. No. 536,557, now Patent 3,413,184, or in the copending application Ser. No. 635,864 mentioned above entitled Environment Adapted Spongeous Transfer Medium. The above blend of nylon and other raw materials for the transfer layer is applied to a temporary support layer, which is preferably paper as described in the copending application mentioned above entitled Environment Adapted Spongeous Transfer Medium, instead of the Mylar polyethylene terephthalate as stated in Example I of Ser. No. 536,557. The paper moves through a chamber in which the solvent, the ethyl alcohol, is evaporated rather quickly. In the same chamber, but at a very much slower rate, the synthetic kerosene, which is slowly volatile relative to the ethyl alcohol, is also evaporated. The rate of feed of the paper substrate through the chamber need not be reduced appreciably. There is no substantial doubt that the ethyl alcohol is largely evaporated while the synthetic kerosene remains in large amounts. Subsequently, a backing layer as thick as desired of additional nylon as described in Example I of Ser. No. 536,557, now Patent 3,413,184, and in the above mentioned copending application Ser. No. 635,864, generally to a dry thickness in the order of magnitude of 0.0005 inch, is applied. This may be applied after passing all of the paper substrate through the applicator while forming the solid matrix medium on it, and then moving the paper substrate as a bulk roll to the start of the coater and passing it through the coater once again, this time with the applicator applying nylon in an ethyl alcohol and water mixture onto the top of the matrix transfer material.

Transfer mediums made in accordance with this invention exhibit a 25 percent increase in intensity of image color as compared to otherwise comparable transfer mediums at the same writing pressure. Pore size and other such factors in the products in accordance with this invention have, by careful analysis, been shown to be essentially the same size and location as would be expected for a product made from the liquid blend with an amount on non-volatile liquid which is the same as the volume of the liquid ink and the kerosene combined. The volume of the average of the pores is roughly three-fourths filled after the processing in accordance with the preferred embodiment described above. The re-use capabilities as a typewriter ribbon are good. Careful analysis has established that at most only trace amounts of the synthetic kerosene remains in the final product, thereby establishing that the mechanism which provides the denser print is one caused by the physical configuration of the pores rather than by a change in the vehicle of the ink due to the presence of the synthetic keresene.

Due primarily to the relatively greater solubility of nylon than the relatively less soluble ink vehicles, as both are dispersed in the ethyl alcohol, a stratification results, as shown in FIG. 3 of the above mentioned copending application entitled Environment Adapted Spongeous Transfer Medium and also as discussed in the application Ser. No. 536,557, now Patent 3,413,184, above mentioned. The stratification is of the pores and of the resin body so that more pores and therefore more ink is at the surface of the transfer medium which is to be the surface from which printing to paper or other receptive surfaces is made. As mentioned above, in accordance with this invention, the preferred embodiment also has, at the surface from which printing is to be made, an average pore volume which is at least twice the volume of the continuous phase.

Two factors attributable to the above mentioned copending application Ser. No. 635,864 entitled Environment Adapted Spongeous Transfer Medium are utilized in this preferred embodiment. One is simply that no ink is spontaneously extruded to the surface of the product, even when the product is in extreme conditions of high humidity. As noted in that copending application, nylon is hygroscopic and swells from moisture adsorbed, thereby forcing ink to the surface. Dirty printing and poor handling characteristics result. The copending application removes relatively small amounts of ink from such a transfer layer before use to overcome this mechanism. Since in accordance with this invention large empty spaces are created in the pores, the tendency to squeeze out ink is also theoretically overcome simply by the driving out of the low volatility material. Since this is a theoretical or average effect, however, it has been found in practice that the humidity treatment in an absorptive laminate as described in that copending application is necessary or relatively small amounts of ink will be forced to the surface by some high humidity environments even after driving out of low volatility material. Secondly, prior to that copending application there was no technique to make possible practical and efficient casting on paper or other known expendable substrates. In this preferred embodiment the bulk roll of matrix transfer medium is made on paper and is treated at 90 degrees Fahrenheit and 90 percent relative humidity. This tends to separate the paper from the transfer medium and the two are pulled apart easily.

The bulk product produced is, of course, cut or slit and packaged as desired. The preferred form is a typewriter ribbon for a typewriter having only moderate printing impact. Therefore, for that use the bulk transfer medium is slit and rolled onto hubs or spools for use as a typewriter ribbon.

It is clear that the low volatility ingredient need not be a synthetic kerosene to practice this invention. A number of relatively low volatility materials having the capability of being expelled from the solid matrix material formed have been used with good results. It is generally preferred, however, that the added ingredient not be highly miscible with the liquid portion of the fluid ink removal of the ingredient may be then accomplished in an environment only relatively moderately conducive to evaporation. The low volatility ingredient should be slightly miscible with the fluid ink so that it initially fills pores occupied substantially also by that ink. Similarly, the expulsion of ink to obtain substantially ink depleted pores might be accomplished by some other alternative, such as a pressure operation in a sandwich with an absorbent material. Such a pressure treatment has been experimented with at this time. The pressure treatment was effected with handling and control which would be difficult and expensive to implement commercially within the required tolerances. In a laboratory experiment using pressure and an absorptive surface to drain out relatively large amounts of the liquid ink in a matrix transfer medium as described, print density increase as expected in accordance with the above description of this invention was realized, but not to any commercial extent.

In all the above, it will be clear that the features herein described are not restricted to the form of fabrication described in application Ser. No. 536,557, now Patent No. 3,413,184, or the above mentioned copending application Ser. No. 635,864 entitled Environment Adapted Spongeous Transfer Medium. Specifically, matrix transfer mediums are often made by casting a fluid blend of raw materials on a support, which might be a paper or resinous support, with the support remaining permanently as a part of the final product. Controlling of the relative amount of liquid in the pores formed in such processes may be done in various ways in accordance with the above teachings. Also, the ink need not be liquid at all times. Thus, the ink could be a gel or other solid under ambient conditions so long as it flows when impacted by the high pressures of typing or printing. It is, of course, clear that the stratification of pores between the printing surface and the support layer is not a factor essentially important to the instant invention.

While the invention has been particularly shown and described with reference to a preferred embodiment thereof, it will be understood by those skilled in the art that the foregoing and other changes in form and details may be made therein without departing from the spirit and scope of the invention.

I claim:
1. A process for making a transfer medium having a resinous body holding flowable ink generally in the manner of a sponge comprising:
    mixing a flowable transfer ink, a particulate filler material, and a liquid of low but significant volatility with a solution of a film forming polymer in a volatile solvent for said polymer, which solvent is more volatile than said liquid, to form a dispersion of said ink, filler and liquid in said solution,
    casting a coating of said dispersion on a support layer,
    heating said coating to remove said solvent to form a porous polymer film in the pores of which said ink and said liquid are distributed,
    additionally heating said coating to remove said liquid and leave said pores substantially less than filled with said ink such that said medium will produce more dense printed images.
2. The process of claim 1 wherein said filler material is woodflour, said liquid is kerosene, said film forming polymer is nylon, and said solvent is ethyl alcohol.
3. The process of claim 1 including the step of coating a backing layer onto said film and stripping said film from said support layer.
4. The process as in claim 1 in which sufficient liquid is added and removed such that the volume of the average of said pores is less than 85 percent filled with ink.
5. The process as in claim 4 in which said forming is so that said pores occupy at least two-thirds of the total volume of said transfer medium near a surface of said transfer medium which is to be used for printing.
6. The process as in claim 1 in which sufficient liquid is added and removed such that the volume of the average of said pores is roughly three-fourths filled with flowable ink.
7. The process as in claim 6 in which said forming is so that said pores occupy at least two-thirds of the total volume of said transfer medium near a surface of said transfer medium which is to be used for printing.
8. The process as in claim 6 in which said liquid accounts for in the order of magnitude of one-fourth part by volume of the total volume of said flowable ink and said less volatile ingredient when combined.
9. The process as in claim 1 in which said less volatile ingredient is miscible with, but is not highly miscible with said flowable ink.

References Cited

UNITED STATES PATENTS

| | | | |
|---|---|---|---|
| 1,673,958 | 6/1928 | Vannote | 117—36.1 |
| 3,055,297 | 9/1962 | Leeds | 117—36.1 |
| 3,117,018 | 1/1964 | Strauss | 117—36.1 |
| 3,287,153 | 11/1966 | Schwarz et al. | 117—36.1 |
| 3,303,046 | 2/1967 | Chebiniak et al. | 117—36.1 |
| 3,306,867 | 2/1967 | Popiolek | 117—36.1 |
| 3,314,814 | 4/1967 | Newman | 117—36.1 |
| 3,413,183 | 11/1968 | Findlay et al. | 117—36.2 XR |
| 3,413,184 | 11/1968 | Findlay et al. | 117—36.1 XR |

MURRAY KATZ, Primary Examiner

U.S. Cl. X.R.

117—36.1, 155; 161—160; 264—53, 216